US007689665B2

(12) United States Patent  (10) Patent No.: US 7,689,665 B2
Lipton et al.  (45) Date of Patent: Mar. 30, 2010

(54) DYNAMICALLY LOADING SCRIPTS

(75) Inventors: Eilon J. Lipton, Bellevue, WA (US); Bertrand Claude Le Roy, Bellevue, WA (US); Simon Calvert, Issaquah, WA (US); Matthew E. Gibbs, Redmond, WA (US); Nikhil Kothari, Sammamish, WA (US); Michael James Harder, Bellevue, WA (US); David Vincent Reed, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 348 days.

(21) Appl. No.: 11/741,095

(22) Filed: Apr. 27, 2007

(65) Prior Publication Data

US 2008/0271046 A1    Oct. 30, 2008

(51) Int. Cl.
*G06F 15/16* (2006.01)
*G06F 17/30* (2006.01)
*G06F 7/04* (2006.01)
*G06F 17/00* (2006.01)

(52) U.S. Cl. ............... 709/217; 707/10; 726/27; 715/205

(58) Field of Classification Search ............ 709/217, 709/219, 226–227; 715/500; 707/10; 726/27
See application file for complete search history.

(56) References Cited

U.S. PATENT DOCUMENTS

| 5,835,712 | A | 11/1998 | DuFresne |
| 6,681,995 | B2 | 1/2004 | Sukeda et al. |
| 6,691,176 | B1 | 2/2004 | Narin et al. |
| 6,976,210 | B1 | 12/2005 | Silva et al. |
| 7,020,574 | B2 | 3/2006 | Eden et al. |
| 7,143,355 | B2 | 11/2006 | Yamaguchi et al. |
| 7,478,434 | B1 * | 1/2009 | Hinton et al. ............... 726/27 |
| 2002/0120746 | A1 * | 8/2002 | Patil et al. ................. 709/227 |
| 2002/0124045 | A1 | 9/2002 | Moore et al. |
| 2003/0001013 | A1 | 1/2003 | Akamine |
| 2004/0167982 | A1 * | 8/2004 | Cohen et al. ............... 709/226 |
| 2005/0240662 | A1 * | 10/2005 | Wiener ..................... 709/219 |
| 2005/0268243 | A1 | 12/2005 | Moser |

(Continued)

FOREIGN PATENT DOCUMENTS

WO    WO03102753    12/2003

(Continued)

OTHER PUBLICATIONS

Benedikt, Michael, et al., "VeriWeb: Automatically Testing Dynamic Web Sites" Bell Laboratories, Lucent Technologies, May 2002.

(Continued)

*Primary Examiner*—Joseph E Avellino
*Assistant Examiner*—Kiet Tang
(74) *Attorney, Agent, or Firm*—Workman Nydegger (57) ABSTRACT

The present invention extends to methods, systems, and computer program products for dynamically loading scripts. Web pages can include references to script loaders that control the loading of other scripts at a Web browser. A script loader can load scripts in accordance with script loading rules that override the default script loading behavior of the Web browser. Script loading rules can cause scripts to load in a different order than encountered in a Web pager, load in parallel, load in a manner that limits cross-domain requests, etc. Script loading rules are configurable such at that a developer can create customized script loading behavior.

15 Claims, 2 Drawing Sheets

U.S. PATENT DOCUMENTS

| | | | |
|---|---|---|---|
| 2005/0273613 | A1 | 12/2005 | Dellmark et al. |
| 2006/0149746 | A1* | 7/2006 | Bansod et al. ................. 707/10 |
| 2007/0067418 | A1* | 3/2007 | Isaacs et al. ................ 709/219 |
| 2007/0106757 | A1* | 5/2007 | Malmer et al. .............. 709/217 |
| 2007/0198907 | A1* | 8/2007 | Degala et al. ............... 715/500 |

OTHER PUBLICATIONS

Nadeau, David, et al., "The Virtual Reality Behavior System (VRBS) A Behavior Language Protocol for VRML", 1995 ACM, pp. 53-61.

Olshefski, David, et al., "Using Certes to Infer Client Response Time at the Web Server", ACM Transaction on Computer Systems, vol. 22, No. 1, Feb. 2004, pp. 49-93.

Lim, Seung Chan [Slim], et al., "JDA: A Step Towards Large-Scale Reuse on the Web", OOPSLA'Oct. 6, 2006, pp. 586-601.

* cited by examiner

DYNAMICALLY LOADING SCRIPTS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

One common form of network based communication is exchanging electronic messages on the Worldwide Web ("WWW"). Content on the Worldwide Web is typically accessed in a client/server model. A "Web browser" of a client computer system sends a request to access content that is provided by a "Web Server" of a server computer system (e.g., by entering a Uniform Resource Locator ("URL") into the Web browser). If the user of the Web browser is authorized to access the content, the Web server typically provides the content to the Web browser. In a Web environment, content and requests for content, are frequently transported using Hypertext Transfer Protocol ("HTTP"). Web-based content can be provided in HyperText Markup Language ("HTML") pages, style sheets, images, scripts, etc.

For example, scripts can be used to perform more complex operations than otherwise allowable using only HTML directives. Generally, scripts are executable code that can be executed at a Web server to add content to a page or can be sent down to a Web browser for execution at the Web browser to add content to a Web page. Scripts can be developed in a scripting (programming) language, such as, for example, JavaSript, VBScript, ASP, PUP, Perl, or ASP .Net. A web server can maintain pages can include both server-side and client-side scripts. Server-side scripts can be used to obtain data accessible to a Web server for inclusion in a Web page. Client side scripts are useful for acquiring and presenting data that may be unique to a client machine, such as, for example, a local time and date. However, more complex client side scripts, such as, for example, that request data or additional scripts from the Web server or other Web servers, are also possible.

When a Web server receives a Web browser request for a Web page that includes server-side script, the Web server passes the server-side script off to an appropriate script engine. The script engine processes the script and returns corresponding HTML directives representative of the server-side scripts functionality. The corresponding HTML directives are then injected into a Web page for return to the Web browser (along with any client-side scripts).

For example, if a server-side script is configured to query and return 10 database rows, the script engine returns the 10 database rows in a HTML format to the Web server. The Web server then injects the HTML representing the 10 database rows into any other HTML directives and client-side scripts in the Web page. After all server-side scripts are processed, the resulting HTML from processing the server-side scripts, other HTML, and any client-side scripts are sent back to the Web browser.

Client-side scripts can be embedded in a Web page or can be included in a separate file. When a client-side script is included in an external file, a Web page can include a script reference (e.g., <script type="text/javascript" src="hello.js"></script>) referencing the script. Client-side scripts and script references can be included in-line in a Web page that is sent to a Web browser. Thus, as the Web browser processes the Web page it can encounter embedded client-side scripts as well as script references to client-side scripts.

Upon encountering an embedded script, the Web browser can refer out an appropriate script engine to process the script. Upon encountering a client-side script reference, the Web browser can load the referenced script (e.g., when a copy of the script is already cached) to the script engine for processing or it can request the script from the Web server. The Web server can then return the script to the Web browser and the Web browser can load (and potentially also cache) the script to the script engine for processing.

Web browsers typically assume that any scripts encountered later in a Web depend on scripts encountered earlier in a Web page. Thus, Web browsers typically load scripts one after another in the order the scripts are encountered within the Web page. However in many Web pages, subsequently encountered scripts do not depend on any previously encountered scripts. Thus, unfortunately, and especially for Web pages with large numbers of client side scripts, one after another loading is relatively inefficient.

Further, when developing a Web page, a developer may choose to include previously developed client-side scripts to utilize client side functionality. To some extent the developer may assume that the previously client-side scripts function as intended. Alternately, the developer may lack the time, desire, or expertise to thoroughly test any previously developed client-side scripts. Nonetheless, one or more client-side scripts may fail to load or run when the Web page is deployed. Unfortunately, typical Web browsers (and script engines therein) provide little, if any, useful context, for example, indicating the circumstances of the client-side script failure, back to the Web page developer. Thus, the Web page developer can be required to debug the Web page based on an incomplete record of information related to client-side script failures.

BRIEF SUMMARY

The present invention extends to methods, systems, and computer program products for dynamically loading scripts. A Web browser receives a Web page from a Web server in response to a request for the Web page from the Web browser. The Web page includes a reference to a script loader. The script loader is configured to, upon execution, create a data structure for queuing other script references. The script loader also configured to, upon an indication from the Web browser, dynamically load scripts referenced in the Web page in accordance with script loading rules to override the default script loading behavior of the Web browser The Web browser executes the script loader. The script loader creates a data structure for queuing script references. The Web browser processes the Web page to queue any script references included in the Web page in the data structure. The script loader populates the queue with script the references included the Web page. The Web browser detects that no further script references are included in the Web page subsequent to queuing any script references included in the Web page.

The Web browser indicatives to the script loader that no further script references are included in the Web page. The script loader receives the indication from the Web browser that no further script references are included in the specified Web page. The script loader causes scripts referenced by the queued script references to load in accordance with script loading rules to override the default script loading behavior of the Web browser. The Web browser includes any relevant script results in a rendering of the Web page.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for dynamically loading scripts. A Web browser receives a Web page from a Web server in response to a request for the Web page from the Web browser. The Web page includes a reference to a script loader. The script loader is configured to, upon execution, create a data structure for queuing other script references. The script loader also configured to, upon an indication from the Web browser, dynamically load scripts referenced in the Web page in accordance with script loading rules to override the default script loading behavior of the Web browser The Web browser executes the script loader. The script loader creates a data structure for queuing script references. The Web browser processes the Web page to queue any script references included in the Web page in the data structure. The script loader populates the queue with script the references included the Web page. The Web browser detects that no further script references are included in the Web page subsequent to queuing any script references included in the Web page.

The Web browser indicatives to the script loader that no further script references are included in the Web page. The script loader receives the indication from the Web browser that no further script references are included in the specified Web page. The script loader causing scripts referenced by the queued script references to load in accordance with script loading rules to override the default script loading behavior of the Web browser. The Web browser includes any relevant script results in a rendering of the Web page.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise physical (or recordable type) computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links)

through a network, both perform tasks. In a distributed system environment, program modules may be located in both local and remote memory storage devices.

Figure 1:
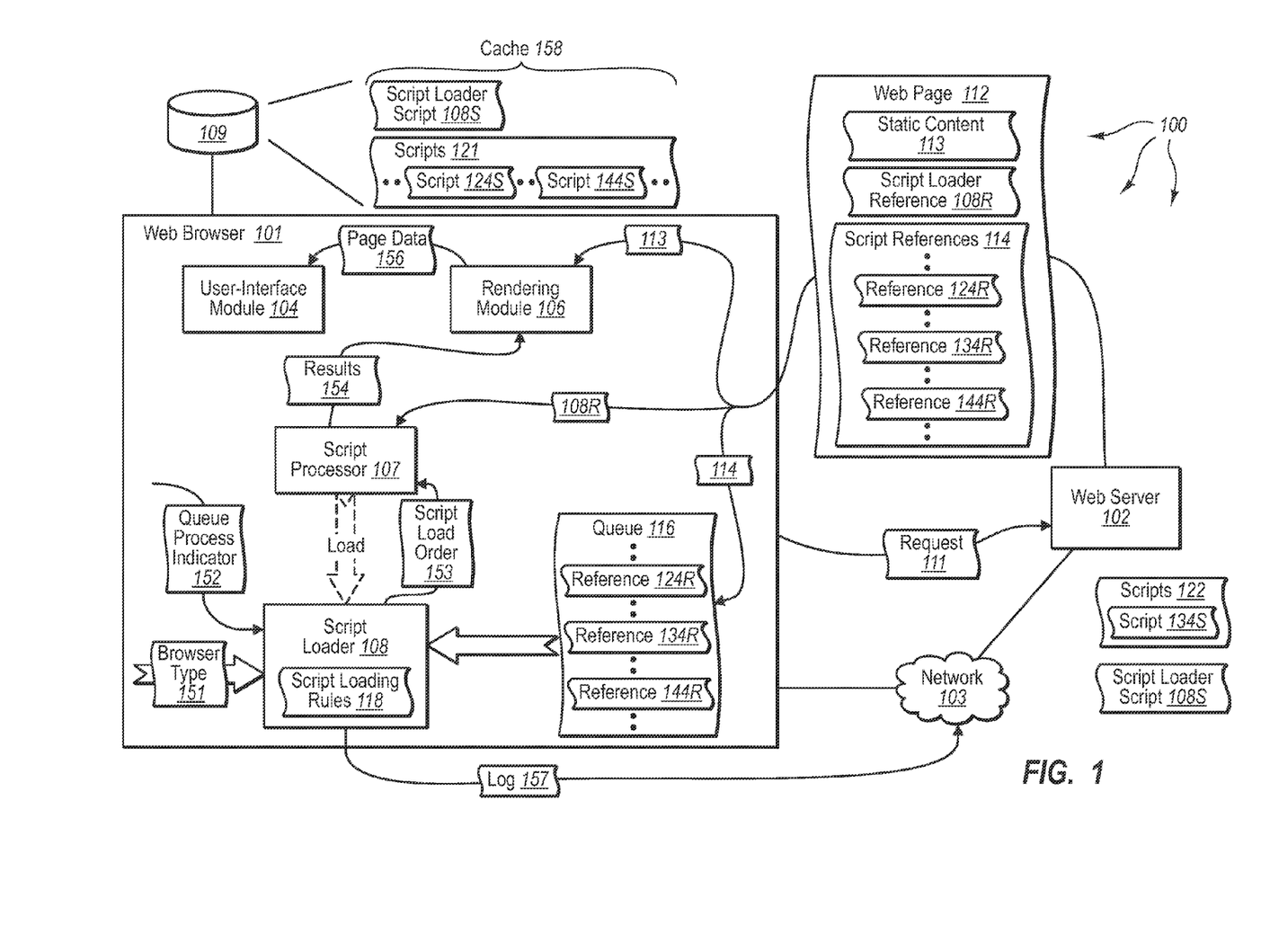
FIG. 1 illustrates an example computer architecture that facilitates dynamically loading scripts.

FIG. 1 illustrates an example computer architecture 100 that facilitates dynamically loading scripts. As depicted, computer architecture 100 includes Web browser 101, Web server 102, and network 103. Web browser 101 and Web server 102 can be connected to network 103, such as, for example, a Local Area Network ("LAN"), a Wide Area Network ("WAN"), or even the Internet. Thus, the components of Web browser 101 and Web server 102 can receive data from and send data to other components connected to network 103. Accordingly, these components can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network. For example, components can exchange HTTP requests and responses and Simple Object Access Protocol ("SOAP") envelopes containing Web service related data.

Generally, Web browser 101 is configured to request (e.g., via an HTTP message to a specified URL) and render Web-based content from Web servers, such as, for example, Web server 104, accessible via network 103. Web-based content can include text data, image data, audio/video data, executable code (e.g., scripts), etc.

Generally, Web server 102 is configured to receive requests for Web-based content (e.g., an HTTP message to a specified URL) and return requested Web-based content back to a requesting Web browser. When Web server 102 receives a request, it can identify a server-side page that corresponds to the request (e.g., dispatching the request to an appropriate process based on a URL contained in the request). Web server 106 can then load the identified server-side page.

When the server-side page includes server-side script references, Web server 106 can send the referenced server-side scripts (e.g., ASP .Net instructions) to a server-side script processor for processing. The script processor processes the server-side scripts and returns any corresponding results back to Web server 102. Web server 102 can then include the results (potentially after additional formatting), along with other content and any client-side script references, in a Web page. Web server 102 can then return the Web page to the requesting Web browser.

Thus, for example, it may be that Web browser 101 sends requests 111 (an HTTP GET) to Web server 101 (by utilizing an appropriate URL for Web server 102). Web server 102 can process request 111 and generate/obtain corresponding content (static or dynamically accessed through server-side scripts). The corresponding content and any client-side script references can be returned to Web browser 101 in Web page 112 (e.g., contained in an HTTP message). Client-side script references can reference scripts stored in various different locations (e.g., in scripts 122) at Web server 102, such as, for example, in the directory structure of a mass storage device or an assembly (e.g., a dynamic link library ("DLL")), etc., or can reference scripts at other Web servers. Web server 102 can then return Web page 112 back to Web browser 101 in response to request 111.

When Web browser 101 receives a Web page, it can allocate various portions of the Web page to modules that are configured to process the portions of the Web page. Thus, when Web browser 101 receives Web page 112, static content, such as, for example, static content 113, can be allocated to rendering module 106. Any script (e.g., JavaScript, VB script, etc.) or script reference such as, for example, script reference 108R, can be allocated to an appropriate script processor, such as, for example, script processor 107. Scripts previously executed at Web browser 101 may be stored at mass storage 109, such as, for example in cache 158. Thus, in response to receiving a client-side script reference, Web browser 101 can obtain the corresponding client-side script from a Web server (which may or may not be the Web server that sent the client-side script reference) via network 103 or from cache 158.

Script processor 107 can execute scripts and return any resulting content (if there is any) to rendering module 106. For example, script processor 107 can return results 154 to rendering module 106. Rendering module 106 can render data at user-interface 104. For example, rendering module 106 can render page data 156 at user-interface 104. Rendering module 106 can render content as it is received such that some portions of a Web page (e.g., static content) are rendered before other portions of a Web page (e.g., script results).

Figure 2:
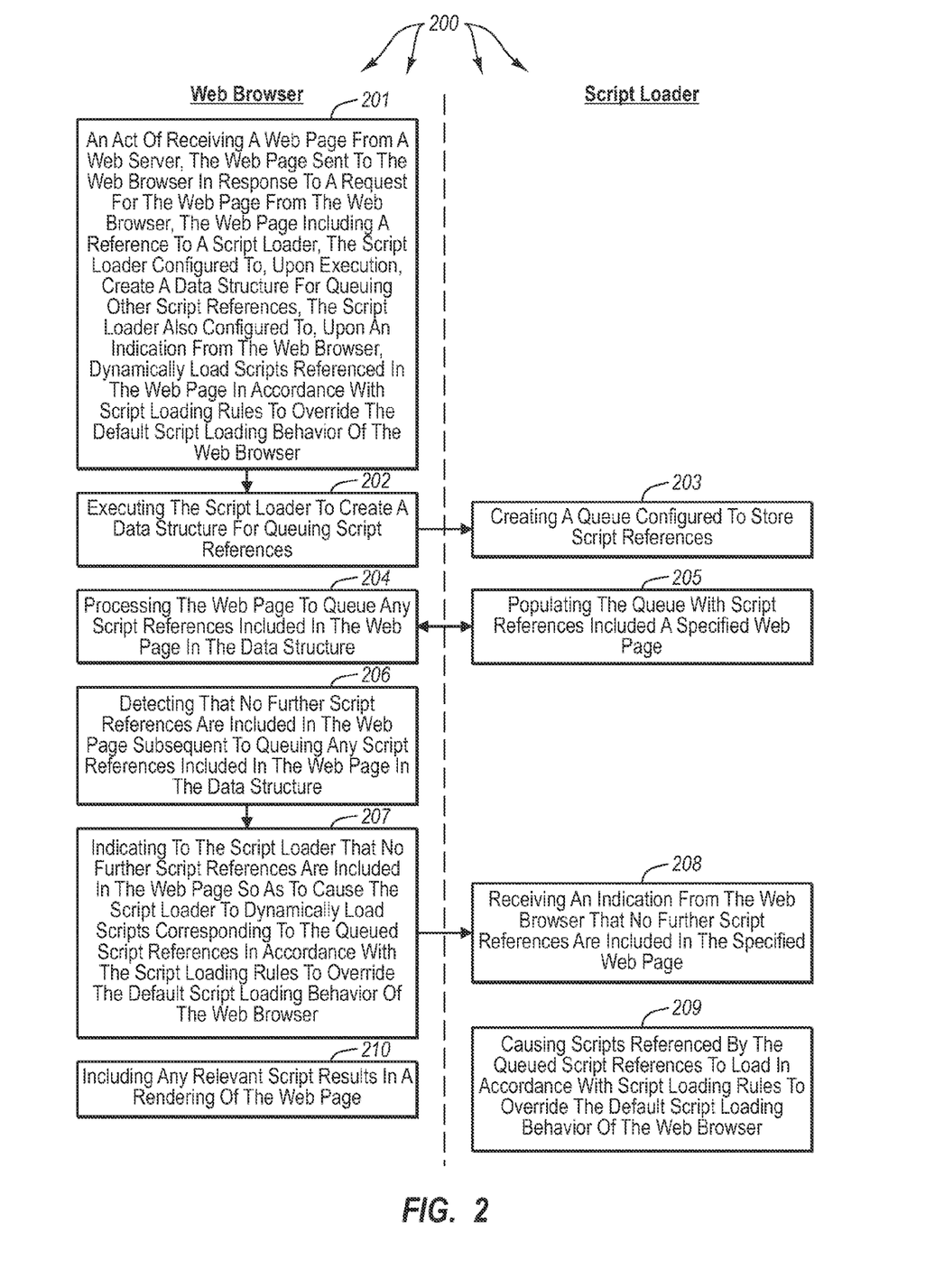
FIG. 2 illustrates a flow chart of an example method for dynamically loading scripts.

FIG. 2 illustrates a flow chart of an example method 200 for dynamically loading scripts. Method 200 will be described with respect to the components and data in computer architecture 100.

Method 200 includes an act of receiving a Web page from a Web server, the Web page sent to the Web browser in response to a request for the Web page from the Web browser (act 200). The Web page includes a reference to a script loader that is configured to, upon execution, create a data structure for queuing other script references. The script loader is also configured to, upon an indication from the Web browser, dynamically load scripts referenced in the Web page in accordance with script loading rules to override the default script loading behavior of the Web browser.

For example, Web browser 101 can receive Web page 112 in response to request 111. Web page 112 includes script loader reference 108R referring to script loader script 108S. Script loader script 108S is configured to, upon execution, create a data structure for queuing other script references in Web page 112, such as, for example, 124R, 134R, and 144R. Script loader script 108S is also configured to, upon an indication from Web browser 101, dynamically load scripts referenced in Web page 112 in accordance with script loading rules 118. Script loading rules 118 can override the default script loading behavior of Web browser 101.

Script loading rules 118 can include logic and policies for loading scripts at Web browser 101. Accordingly, script loader 108 can apply script loading rules 118 to client-side script references in queue 116 to create script load order 153. Script loading rule logic can include algorithms for enumerating client-side script references included in queue 116. For example script loading rules 118 can enumerate references 124R, 134R, 144R, etc.

From enumerated client-side script references, other script loading rule logic can include algorithms to identify the dependencies of corresponding referenced scripts to one another and/or to other external resources. For example, script loader 108 can execute script loading rules can determine that script 134S depends on script 124S and that script 144S is not dependent on any other scripts. From enumerated client-side script references, other script loading rule logic can include algorithms to identify scripts that include cross-domain requests. For example, script loader 108 can execute script loading rules to determine how many requests to servers other than Web server 102 are to occur when the referenced scripts are executed.

Other script loading rule logic can include algorithms for identifying other characteristics of and/or relationships between referenced scripts. Script loading rule logic is also extensible such that developers can develop their own script loading rule logic to identify characteristics of and/or relationships between referenced scripts in a Web page. Alternately, a developer can modify existing script loading rule logic to customize the script loading rule logic for a designated purpose.

Script loading rule policies indicate how to load enumerated referenced scripts based on characteristics of and/or relationships between the enumerated scripts. Script loading rule policies can be applied to script references enumerated from in queue 116 to load corresponding scripts in a specified order. A script loading order can be indicated based on identified script dependencies as well as other script relationships and characteristics.

In some embodiments, script loading rule policies are applied to load enumerated referenced scripts in a specified order that is different than the order the referenced scripts appeared in a Web page (out of order loading). For example, it may be that script references 124R, 134R, and 144R are include din Web page 112 in that order. That is, reference 124R is closer to the top of Web page 112 and reference 144R is closer to the bottom of Web page 112. However, script loading rule policies can indicate that script 134S is to be loaded before scripts 124S and 144S, even though reference 124R was received before reference 134R. Further, script loading rule policies can indicate that script 144S is to be loaded before script 124S, even though reference 124R was received before reference 144R.

In other embodiments, script loading rule policies are applied to load enumerated referenced scripts in parallel (parallel loading). For example, script loading rule policies can indicate that scripts 124S and 144S are to be loaded in parallel since script 124S does not depend on script 144S and script 144S does not depend on script 124S.

In other embodiments, script loading rule policies are applied to load enumerated scripts in a manner that limits the number of concurrent-cross domain requests to a specified domain. For example, script loading rule policies can indicate that scripts are to be loaded in an order that limits the number of concurrent requests to Web servers other than Web server 102 to a specified threshold.

Script loading rule policies are also extensible such that developers can develop their own script loading rule policies to load scripts in a designated manner. Alternately, a developer can modify existing script loading rule policies to customize script loading rule policies for a designated purpose. For example, rather than loading scripts sequentially, script loading rule policies can indicate that scripts are to be loaded in parallel for given known set of dependencies.

Script loader 108 can also consider individual browser characteristics when formulating a script load order such scripts are appropriately loaded within a browser environment. For example, script loader 108 can consider browser type 151 (and may be aware of script loading characteristics for browser type 151) when formulating script load order 153.

In some embodiments, script loading rules 118 are hardcoded into script loader 108. Thus to customize script loading rules 118 in these embodiments, a developer can modify the source code for script loader 108 to customize script loading rules 118 (and thus also customize script load 108) for a designated purpose. In other embodiments, script loader 108 accesses script loading rules 118 externally. Thus to customize script loading rules 118 in these other embodiments, a developer can modify the externally accessible script loading rules 118 to customize script loading rules 118 for a designated purpose.

Script loader 108 can provide APIs for interfacing with browser 101 and script processor 107.

Method 200 includes an act of executing the script loader to create a data structure for queuing script references (act 202). For example, script processor 107 can load script loader 108 to create queue 116. Script loader reference 108R can be included inline close to (or at) the top of Web page 112. Thus, there is an increased likelihood that script loader reference 108R is the first reference encountered. Due to the default behavior of Web browser 101 (e.g., loading scripts sequentially), script processor 107 can processes script loader reference 108R before any other scripts or script references. Accordingly, processing script reference 108S to load script loader 108 essentially boot straps script loading behavior that overrides the default script loading behavior of Web browser 101.

Method 200 includes an act of creating a queue configured to store script references (act 203). For example, script loader 108 can create queue 116 to store client-side script references in Web page 112. Method 200 includes an act of processing the Web page to queue any script references included in the Web page in the data structure (act 204) and an act of populating the queue with script references included a specified Web page (act 205). For example, Web browser 101 and script loader 108 can interoperate to process Web page 112 and store queue references 124R, 134R, and 144R in queue 116.

Method 200 includes an act of detecting that no further script references are included in the Web page subsequent to queuing any script references included in the Web page in the data structure (act 206). For example, Web browser 101 can detect that no further script references are included in Web page 112 subsequent to references 124R, 134R, and 144R being queued into queue 116.

Method 200 includes an act of indicating to the script loader that no further script references are included in the Web page (act 207). Indicating that no further references are included causes the script loader to dynamically load scripts corresponding to the queued script references in accordance with the script loading rules to override the default script loading behavior of the Web browser. For example, Web browser 101 can send queue process indicator 152 to script loader 107 when all the references from Web page 112 have been queued into queue 116. Queue process indicator 152 can cause script loader 108 to dynamically load scripts queued in queue 116 in accordance with script loading rules 118.

Method 200 includes an act of receiving an indication from the Web browser that no further script references are included in the specified Web page (act 208). For example, script loader 108 can receive queue process indicator 152 from Web browser 101. Method 200 includes an act of causing scripts referenced by the queued script references to load in accordance with script loading rules to override the default script loading behavior of the Web browser (act 209). For example, script loader 108 can cause scripts 124S, 134S, and 144S, as well as other referenced scripts in Web page 112, to be loaded in accordance with script loading rules 118 to override the default script loading behavior of Web browser 101.

Script load order 153 collectively represents an order for loading the scripts referenced in Web page 112. In some embodiments, script processor and script loader 108 communicate to coordinate the actual loading of scripts. For example, script loader 108 can send a command to script processor 107 to load one or more scripts. When the one or more scripts are loaded, script processor 107 can indicate that the one or more scripts are loaded to script loader 108. Script loader 108 can then send another command to load another one or more scripts to script loader 108. When the other one or more scripts are load, script processor 107 can indicate that the other one or more scripts are loaded to script loader 108. A similar mechanism can occur until scripts references in Web page 112 are loaded.

Accordingly, script loader 108 and script processor 107 can interoperate to load scripts in a different order than encountered in Web page 112, to load a plurality of scripts in parallel, to load scripts in a manner that limits concurrent cross-domain requests, etc. Script loader 108 can also cause scripts to be loaded in a manner that does not violate script loading characteristics of Web browser 101 (based on browser type 151).

Some loaded scripts can generate content for inclusion in Web page 112. Results 154 collectively represent any content returned from executed client side scripts at Web browser 101. Script processor 107 can send results 154 to rendering module 106. Method 200 includes an act of including any relevant script results in a rendering of the Web page (act 210). For example, rendering module 106 can include results 154 in page data 156 (data representing Web page 112). Rendering module 106 can render page data 156 at user-interface 104.

Thus, embodiments of the present invention facilitate loading scripts at a point prior to init and load events associated with client-side script loading. A script loader reference can be returned back to a Web browser to facilitate this behavior in a number of different cases.

In one embodiment, a script loader reference is returned to a Web browser when an initial request to a Web application is an HTTP GET. A script loader reference is included inline at the top of a returned Web page, such as, for example: <script src="ScriptLoader.js"/>

A script loader is created and registered for the Web application, such as, for example:

```
Sys.Application.set_scriptLoader( new Sys.ScriptLoader( ));
//
this._loader.add_allScriptsLoaded (
this._allScriptsLoadedDelegate);
```

Script references, including references, inline scripts, and handlers, are queued into the script loader. As previously described scripts can be loaded form a variety of different locations. Thus, scripts can be loaded from custom libraries, such as, for example:

```
Sypplication.queueScriptReference('/ CustomScript.js ') ;
Sys.Application.queueScriptReference( ("Sys.Application.add_init (
$create(Custom.UI.Control, { }, { }, { }, $get('f'))
) ;
Sys.Application.initialize( );
```

The registered script load can then be instructed to load script references it has queued, such as, for example:

```
Sys.Application.get_scriptLoader( ).set_scriptLoadTimeOut(n)
Sys.Application.get_scriptLoader( ).loadScripts( ) ;
```

The script loader can indicate to the Web application when all scripts have been loaded.

In another embodiment, a script loader reference is returned to a Web browser in an asynchronous HTTP POST to a Web application. In this other embodiment, a script load may already have been created and a request manager hooked into an event on the script loaded. Thus registration can occur, such as, for example:

```
Sys.Application.get_scriptLoader( ).
add_allScriptsLoaded(PRM._allScriptsLoadedDelegate);
```

Script references can then be queued with the internal script loader. This includes script references, inline scripts, and any handlers. Thus, scripts can be loaded from custom libraries, such as, for example:

```
Sys.Application.queueScriptReference('/ CustomScript.js ') ;
Sys.Application.queueScriptReference( ("Sys.Application.add_init (
$create(Custom.UI.Control, { }, { }, { }, $get('f'))
);
```

The registered script loader is instructed to load it's script references, such as, for example:

Sys.Application.get_scriptLoader( ).loadScripts( );

In either embodiment as well as other previously described embodiments, a page or component developer is able to define the behavior of loading scripts at a Web browser through APIs and declarative syntax of a script loader. The script manager then generates output that uses a client-side script processor.

Additional script related functionality can also be included in a script loader. For example, a script loader can be configured to write any script loading errors to a log file. Script loading errors can include: timeouts, dependency errors, resource errors, etc. Relevant contextual information about a script loading error can also be written to the log file when a script loading error occurs. A log file can be stored at a location accessible to a page or component developer. For example, upon detecting script loading errors at Web browser 101, script loader 108 can store log 157 to a network location within network 103. A developer can access log 157 from the network location to assist in testing and/or debugging script loader 108 as well as other scripts.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including a processor and system memory, the computer system connected to a network, the computer system including a Web browser configured to render Web pages at the computer system, the Web browser having a default script loading behavior that is used to load client-side scripts at the Web browser, the client-side scripts for generating content at the computer system that is to be included in Web pages rendered by the Web browser, a method for rendering a Web page at the Web browser, the method comprising an act of receiving a Web page from a Web server, the Web page including static content, a reference to a client-side script loader script, and references to a plurality of other client-side scripts, the client-side script loader script configured to, upon execution, create a data structure for queuing the references to the plurality of other client-side scripts, the client-side script loader script also configured to, upon an indication from the Web browser, load the plurality of other client-side scripts in accordance with script loading rules, the script loading rules including loading rule logic configured to load the plurality of other client-side scripts based on identified characteristics of the plurality of other client-side scripts and based on identified relationships between any of the plurality of other client-side scripts so as to override the default script loading behavior of the Web browser;
an act of the processor executing the client-side script loader script to create a data structure at the computer system, the data structure for storing the references to the plurality of other client-side scripts;
an act of the client-script loader script processing the Web page to enumerate the references to the plurality of other client-side scripts;
an act of the processor storing the enumerated references in the data structure;
an act of detecting that no further script references are included in the Web page subsequent to storing the enumerated references in the data structure;
an act of the client-side script loader script referring to the enumerated references to create a script load order for the plurality of other client-side scripts to cause the plurality of other client-side scripts to load in parallel, the script load order based on the loading rule logic, the script load order differing from the order in which the references to the plurality of other client-side scripts were encountered during enumeration;
an act of loading the plurality of other client-side scripts in parallel in accordance with the script load order to generate client-side content for inclusion in the Web page; and
an act of using the static content and the generated client-side content in a rendering of the Web page.

2. The method as recited in claim 1, further comprising:
an act of sending an HTTP GET to the Web server prior to receiving the Web page from the Web server.

3. The method as recited in claim 1, further comprising:
an act of sending an asynchronous HTTP POST to the Web server.

4. The method as recited in claim 1, wherein the act of receiving a Web page, the Web page including static content, a reference to a client-side script loader script, and references to the plurality of other client-side scripts comprises an act of receiving a Web page, wherein the reference to the client-side script loader script is positioned within the Web page such that reference to the client-side script loader script is encountered prior to encountering any references to the plurality of other client-side scripts based on the default script loading behavior of the Web browser.

5. The method as recited in claim 1, wherein the act of the client-side script loader script referring to the enumerated references to create a script load order comprises an act of creating a script load order that limits concurrent cross-domain requests.

6. A computer program product at a computer system, the computer system connected to a network, the computer system including a Web browser configured to render Web pages at the computer system, the Web browser having a default script loading behavior that is used to load client-side scripts at the Web browser, the client-side scripts for generating content at the computer system that is to be included in Web pages rendered by the Web browser, the computer program product for implementing a method for rendering a Web page at the Web browser, the computer program product comprising one or more non-transitory computer-readable storage media having stored thereon computer-executable instructions that, when executed at a processor, cause the computer system to perform the method, including the following:
receive a Web page from a Web server, the Web page including static content, a reference to a client-side script loader script, and references to a plurality of other client-side scripts, the client-side script loader script configured to, upon execution, create a data structure for queuing the references to plurality of other client-side scripts, the client-side script loader script also configured to, upon an indication from the Web browser, load the plurality of other referenced client-side scripts in accordance with script loading rules, the script loading rules including loading rule logic configured to load the plurality of other client-side scripts based on identified characteristics of the plurality of other client-side scripts and based on identified relationships between any of the plurality of other client-side scripts so as to override the default script loading behavior of the Web browser;
execute the client-side script loader script to create a data structure at the computer system, the data structure for storing the references to the plurality of other client-side scripts;
process the Web page to enumerate the references to the plurality of other client-side scripts;
store the enumerated references in the data structure;
detect that no further script references are included in the Web page subsequent to storing the enumerated references in the data structure;
refer to the enumerated references to create a script load order for the plurality of other client-side scripts to cause the plurality of other client-side scripts to load in parallel, the script load order based on the loading rule logic, the script load order differing from the order in which the references to the plurality of other client-side scripts were encountered during enumeration;
an act of loading the plurality of other client-side scripts in parallel in accordance with the script load order to generate client-side content for inclusion in the Web page; and
an act of using the static content and the generated client-side content in a rendering of the Web page.

7. The computer program product as recited in claim 6, further comprising:
computer-executable instructions that, when executed, cause the computer system to send an HTTP GET to the Web server prior to receiving the Web page from the Web server.

8. The computer program product as recited in claim 6, further comprising:
computer-executable instructions that, when executed, cause the computer system to send an asynchronous HTTP POST to the Web server.

9. The computer program product as recited in claim 6, wherein computer-executable instructions that, when executed, cause the computer system to receive a Web page, the Web page including static content, a reference to a client-side script loader script, and references to plurality of other client-side scripts comprise computer-executable instructions that, when executed, cause the computer system to receive a Web page, wherein the reference to the client-side script loader script is positioned within the Web page such that reference to the client-side script loader script is encountered prior to encountering any references to the plurality of other client-side scripts based on the default script loading behavior of the Web browser.

10. The computer program product as recited in claim 6, wherein computer-executable instructions that, when executed, cause the computer system to refer to the enumerated references to create a script load order comprise computer-executable instructions that, when executed, cause the computer system to create a script load order that limits concurrent cross-domain requests.

11. A computer system, the computer system comprising:
system memory;
one or more processors; and
one or more computer-readable storage media having stored thereon computer-executable instructions representing a Web browser and a script processor, the Web browser having a default script loading behavior that is used to load client-side scripts at the Web browser, wherein the Web browser is configured to:
receive a Web page from a Web server, the Web page including static content, a reference to a client-side script loader script, and references to a plurality of other client-side scripts, the client-side script loader script configured to, upon execution, create a data structure for queuing the references to the plurality of other client-side scripts, the client-side script loader script also configured to, upon an indication from the Web browser, load the plurality of other referenced client-side scripts in accordance with script loading rules, the script loading rules including loading rule logic configured to load the plurality of other client-side scripts based on identified characteristics of the plurality of other client-side scripts and based on identified relationships between any of the plurality of other client-side scripts so as to override the default script loading behavior of the Web browser;
encounter the client-side script loader script within the Web page;
pass the client-side script loader script to the script processor;
receive client-side content generated by the plurality of other client-side scripts; and
use the static content and the generated client-side content in a rendering of the Web page; and
wherein the script processor is configured to:
load the client-side script loader script, loading client-side script loader script causing the computer system to:
create a data structure at the computer system, the data structure for storing the references to the plurality of other client-side scripts;
process the Web page to enumerate the references to the plurality of other client-side scripts;
store the enumerated references in the data structure;
detect that no further script references are included in the Web page subsequent to storing the enumerated references in the data structure; and
refer to the enumerated references to create a script load order for the plurality of other client-side scripts to cause the plurality of other client-side scripts to load in parallel, the script load order based on the loading rule logic, the script load order differing from the order in which the references to the plurality of other client-side scripts were encountered during enumeration; and
load the plurality of other client-side scripts in parallel in accordance with the script load order to generate client-side content for inclusion in the Web page; and
pass the generated client-side content to the Web browser for rendering in the Web page.

12. The computer system as recited in claim 11, further comprising the Web browser being configured to send an HTTP GET to the Web server prior to receiving the Web page from the Web server.

13. The computer system as recited in claim 11, further comprising the Web browser being configured send an asynchronous HTTP POST to the Web server.

14. The computer system as recited in claim 11, wherein the Web browser being configured to receive a Web page from a Web server, the Web page including static content, a reference to a client-side script loader script, and references to plurality of other client-side scripts comprises the Web browser being configured to receive a Web page, wherein the reference to the client-side script loader script is positioned within the Web page such that reference to the client-side script loader script is encountered prior to encountering any references to the plurality of other client-side scripts based on the default script loading behavior of the Web browser.

15. The computer system as recited in claim 11, wherein loading the client-side script loader script causing the computer system to refer to the enumerated references to create a script load order comprises loading the client-side script loader script to cause the computer system to refer to the enumerated references to create a script loader order that limits concurrent cross-domain requests.

* * * * *